UNITED STATES PATENT OFFICE.

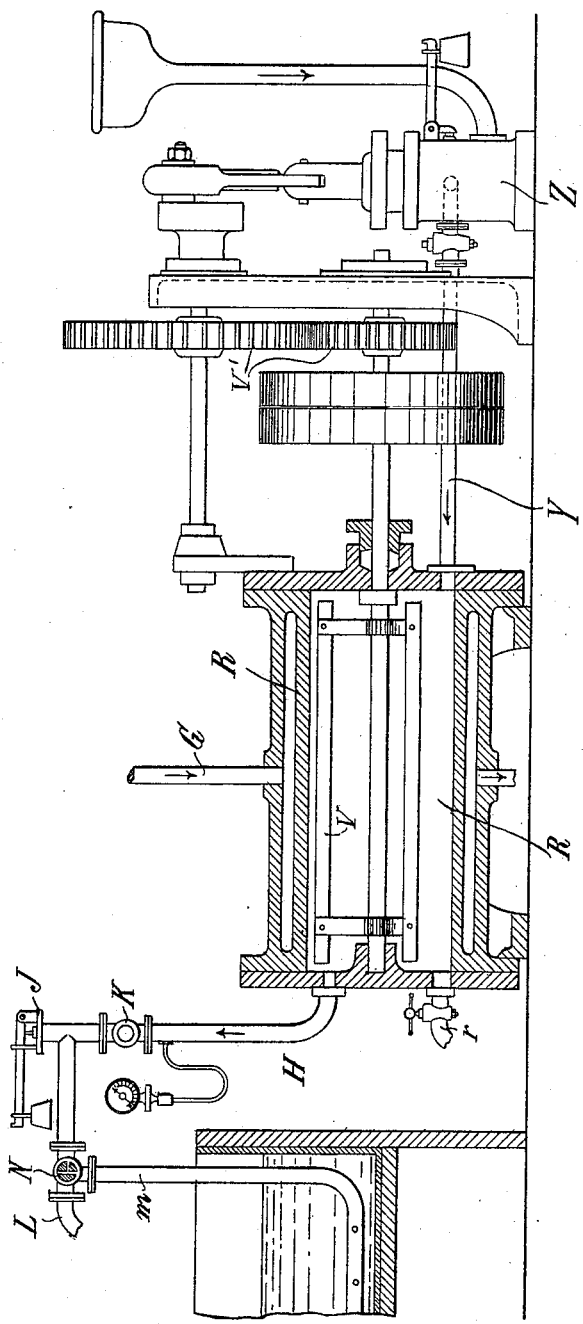

AUGUST STEPHAN, OF BREITENBACH, GERMANY.

APPARATUS FOR TREATING SIZE.

SPECIFICATION forming part of Letters Patent No. 641,343, dated January 16, 1900.

Application filed April 15, 1898. Serial No. 677,754. (No model.)

*To all whom it may concern:*

Be it known that I, AUGUST STEPHAN, a subject of the Emperor of Germany, residing at Breitenbach, near Münster, in Upper Alsace, Germany, have invented certain new and useful Improvements in Apparatus for the Continuous Treatment of Finishing and Dressing Substances, (for which I have applied for patents in Sweden, dated February 28, 1898, No. 335; in Russia, dated February 21, 1898, No. 4,020; in France, dated March 7, 1898, No. 263,489; in Belgium, dated March 7, 1898, No. 104,682; in England, dated March 2, 1898, No. 5,164; in Switzerland, dated February 25, 1898, No. 17,831; in Italy, dated February 28, 1898; in Austria, dated March 1, 1898; in Hungary, dated March 3, 1898, No. 3,080, and in Germany, dated February 24, 1898,) of which the following is a specification.

The present invention relates to an apparatus for continuously preparing, finishing, or dressing substances for use in the finishing, dressing, and dyeing of textiles, the object of the invention being to prepare such substances of a permanently uniform concentration, in which the substances are not boiled under the direct action of steam. All dilution of the finishing substance is consequently avoided.

The apparatus enables the preparation of the finishing or dressing substances in a continuous operation. The raw finishing material is pumped continuously into a closed boiler or cylinder which is surrounded by a second boiler or cylinder, and steam is admitted into the jacket thus formed, by which means the substance is raised to the necessary temperature without access of the heating-steam to the interior of the boiler. It is also subjected to pressure and is thus continuously forced into the finishing-trough.

The working of the apparatus depends upon the peculiar properties evinced by potato-meal upon being boiled in water. Upon heating a thin mixture of potato-meal and water the liquid becomes thicker until it is finally quite pasty. By continuing the heating of the mixture it becomes quite thin again. Now when a thin mixture of potato-meal and water enters at one end through the pump into the apparatus the liquid is converted in a short time into a pasty mass by the heat of the same and a kind of piston of thick paste is formed in the closed cylinder, which piston is pressed continuously farther forward in the cylinder by the material entering until it arrives at the other end, when it will have again attained the thin condition. The thick mass acts, therefore, as a kind of partition-wall which prevents the entering mixture from mixing with the finished product. By means of this partition-wall formed by the thickened mixture it is possible to continuously introduce the unboiled substance and to draw off the finished boiled substance without mixture of the two taking place.

With this apparatus the quantity of the finishing substance entering the trough can be regulated to suit the amount of yarn or other material to be treated.

In the accompanying drawing the double-walled cylinder R is heated by means of the steam, which enters through the tube G and circulates between the two walls, so that it does not come into direct contact with the finishing substance, which latter consequently remains of the same degree of concentration. The raw material is introduced into the cylinder R through the pump Z by means of the tube Y. An eccentric agitating paddle or device V is arranged to turn on a horizontal axis in the cylinder and is operated by suitable means, (indicated at V',) so as to agitate the substance by a circumferential movement without any substantial tendency to mix the portions at one end of the cylinder with the portions at the other end. This result is due to the fact that the paddle-blades are placed endwise of the boiler-cylinder.

The finished product passes through the tube H into the finishing-trough, passing on the way through the automatic escape-valve J, by means of which the pressure of the substance in the boiler can be maintained within the desired limits. The substance is caused to flow out of the cylinder R by the action of the pump Z. The steam formed in the boiler or cylinder assists in the flow of the mass, inasmuch as it forms a kind of cushion, which takes up the shocks of the pump and produces a regular flow. In order to still further increase the action, the outlet-tube H is not arranged at the top, but at a somewhat lower point of the cylinder.

When working, each stroke of the piston of the pump somewhat increases the pressure momentarily and brings the escape-valve into action. If the finishing substance sinks a little beneath the mouth of the tube H, a small quantity of steam escapes; but as soon as the pressure again becomes normal the escape-valve J closes.

The three-way cock N allows the finished product to pass through the tube $m$ or tube L into the finishing-trough. By means of a valve K in the tube H, arranged beneath the valve J, the tube can be closed for a time upon the escape-valve getting out of order, so that the valve and the tube can be conveniently examined.

The raw material introduced into the cylinder R by means of the pump Z through the tube Y is converted by the heat soon after its entrance into a rather pasty mass, which is, however, whirled around by the agitator and is pressed forward in parallel layers away from the cover of the cylinder by the continuously-entering liquid. During this operation the substance is changed into the consistency desired and passes as finished product through the outlet-tube into the finishing-trough. As the thickened substance forms a kind of piston, the mixing of the finished substance is prevented and the escape of insufficiently-boiled finishing substance thus obviated. The cylinder R must be of such a length that the material is boiled for sufficient time. In addition to the possibility of obtaining a finishing substance of constant consistency and continuously introducing the same into the finishing-trough according to requirements the present invention also effects a very considerable economy of steam, as the latent heat of the same is much more effectively used than in the usual process, in which the steam passes without pressure through the finishing substance in the trough.

By means of the cock $r$ the boiler or cylinder for preparing the finishing substance can be emptied, if desired.

Having thus described my invention, what I claim, and desire to secure by Letters Patent, is—

An apparatus for preparing finishing and dressing substances from raw material which when heated becomes pasty and then fluid, comprising a boiler, means for forcing the raw material into the boiler and continuously endwise thereof, steam heating means for heating the boiler without direct contact of the heating-steam with the heated substance, an outlet-pipe connected to the boiler, an automatic escape-valve and a three-way valve in said outlet-pipe, and two pipe connections L, M leading from the three-way valve.

In testimony whereof I have hereunto set my hand in the presence of two witnesses.

AUGUST STEPHAN.

Witnesses:
 ERNEST THERION,
 MARIE GIETZENDANNER.